US012772351B2

(12) United States Patent
Greyling et al.

(10) Patent No.: US 12,772,351 B2
(45) Date of Patent: Oct. 20, 2026

(54) DC BRUSH-ARC FURNACE WITH ARC DEFLECTION COMPENSATION

(71) Applicants: Frederik Petrus Greyling, Middelburg (ZA); Jonathan Graeme Lennox, Middelburg (ZA)

(72) Inventors: Frederik Petrus Greyling, Middelburg (ZA); Jonathan Graeme Lennox, Middelburg (ZA)

( * ) Notice: Subject to any disclaimer, the term of this patent is extended or adjusted under 35 U.S.C. 154(b) by 1224 days.

(21) Appl. No.: 17/769,618

(22) PCT Filed: Nov. 10, 2020

(86) PCT No.: PCT/IB2020/060559
§ 371 (c)(1),
(2) Date: Apr. 15, 2022

(87) PCT Pub. No.: WO2021/105808
PCT Pub. Date: Jun. 3, 2021

(65) Prior Publication Data

US 2024/0138038 A1 Apr. 25, 2024
US 2024/0237167 A9 Jul. 11, 2024

(30) Foreign Application Priority Data

Nov. 27, 2019 (ZA) ................................. 2019/07850

(51) Int. Cl.
*H05B 7/148* (2006.01)
*F27B 3/08* (2006.01)
*F27D 11/08* (2006.01)

(52) U.S. Cl.
CPC ............. *H05B 7/148* (2013.01); *F27B 3/085* (2013.01); *F27D 11/08* (2013.01)

(58) Field of Classification Search
CPC ................................ F27B 3/085; F27D 11/08
(Continued)

(56) References Cited

U.S. PATENT DOCUMENTS 4,549,301 A * 10/1985 Mote ........................ H05B 7/20 373/108
5,590,152 A 12/1996 Nakajima et al.
5,960,027 A * 9/1999 Kiyohara ................ F27B 3/085 373/105

FOREIGN PATENT DOCUMENTS

FR 2548508 A1 * 6/1989 ............... H05B 7/18
WO 94/24504 A1 10/1994
WO 2007/072253 A1 6/2007

OTHER PUBLICATIONS

FR2548508 English Translation (Year: 1989).*
International Search Report and Written Opinion for PCT/IB2020/060559 (Feb. 1, 2021).

* cited by examiner

*Primary Examiner* — Topaz L. Elliott
*Assistant Examiner* — Solan Oliva
(74) *Attorney, Agent, or Firm* — Merchant & Gould P.C.

(57) ABSTRACT

The invention provides for a DC brush-arc furnace comprising a vessel 12 and first and second electrodes 16, 18. A first DC power supply 20 supplies power to the electrodes. A first conductor 26 extends parallel to the first electrode, so that a first current flows in a first direction through the first conductor and in a second opposite direction in the first electrode. A second conductor 28 extends parallel to the second electrode, so that the current flows in the first direction in the second electrode and in the second direction in the second conductor. An arc deflection compensation system 30 comprises a second DC power supply 32 and a compensation circuit 34 comprising a first compensation conductor 36 and a second compensation conductor 38. The second DC power supply causes a second current to flow through the first compensation conductor in the first direc-
(Continued)

tion and through the second compensation conductor in the second direction.

11 Claims, 3 Drawing Sheets

(58) Field of Classification Search
USPC .......................................................... 373/108
See application file for complete search history.

DC BRUSH-ARC FURNACE WITH ARC DEFLECTION COMPENSATION

This application is a National Stage Application of PCT/IB2020/060559, filed Nov. 10, 2020, which claims benefit of Patent Application No. 2019/07850, filed Nov. 27, 2019 in South Africa, and which applications are incorporated herein by reference. To the extent appropriate, a claim of priority is made to each of the above-disclosed applications.

INTRODUCTION AND BACKGROUND

This invention relates to a furnace and more particularly to a DC brush-arc furnace for processing pre-reduced ores and/or pre-heated ores. The invention further relates to a method of controlling brush-arcs in a DC brush-arc furnace.

A known brush-arc AC furnace comprises of a generally circular vessel in transverse cross section comprising a closed top from which three Søderberg electrodes extend axially into a chamber defined by the vessel. The electrodes are connected to three single-phase furnace transformers, alternatively to a single three phase transformer that acts as AC power supply to the furnace. The abovementioned circular vessel is provided with a refractory lining to provide protection against high reaction temperatures caused by the high electric current created by the furnace electrodes. Raw materials comprising in general a combination of metallic ores, reductants and fluxes are fed into the refractory lined vessel on a continuous basis, utilizing devices such as feed chutes extending through the furnace roof. A burden in the furnace comprises a body or layer of molten alloy and a body or layer of slag on top of the body or layer of molten alloy. Molten alloy and molten slag are periodically removed from the molten alloy body and molten slag body respectively, through one or more refractory lined tap holes in the refractory lined vessel. Hot gases emanating from the reaction in the furnace vessel are drawn off via one or more off-take ducts extending through the closed roof of the furnace.

A disadvantage of the brush-arc AC furnace is arc-flare, which is caused by electromagnetic arc-deflection. Arc-flare induces an undesirable stirring action in the slag bath and often overheating of the furnace sidewalls, specifically opposite the electrodes.

OBJECT OF THE INVENTION

Accordingly, it is an object of the present invention to provide a brush-arc furnace and a method of controlling brush-arcs with which the applicant believes the aforementioned disadvantages may at least be alleviated or which may provide a useful alternative for the known furnaces and methods.

SUMMARY OF THE INVENTION

According to the invention there is provided a furnace comprising:

- a vessel defining a chamber;
- at least a first elongate electrode and a second elongate electrode extending parallel to one another from respective first ends and terminating at respective second ends in the chamber;
- a DC power supply system having a first pole and a second pole;
- a first electrical conductor extending between the first pole and the first end of the first elongate electrode, so that a first current $I_1$ flows in a first direction through the first electrical conductor and in a second opposite direction from the first end of the first elongate electrode to the second end of the first elongate electrode to drive the first elongate electrode as an anode;
- a second electrical conductor extending between the second pole and the first end of the second elongate electrode, so that the first current $I_1$ flows in the first direction from the second end of the second elongate electrode to the first end of the second elongate electrode and in the second direction through the second electrical conductor to drive the second elongate electrode as a cathode; and
- an arc deflection compensation system comprising a compensation circuit connected to the DC power supply system, the compensation circuit comprising at least a first compensation circuit conductor part extending parallel to the first elongate electrode and a second compensation circuit conductor part extending parallel to the second elongate electrode, the DC power supply system causing a second current $I_2$ to flow through the first compensation circuit conductor part in the first direction and through the second compensation circuit conductor part in the second direction.

The DC power supply system may comprise a first DC power supply and a second DC power supply, wherein the first DC power supply is connected to the first and second poles and wherein the second DC power supply is connected to the compensation circuit.

The first DC power supply and the second DC power supply may be the same power supply.

The second DC power supply may be different and separate from the first DC power supply.

The first electrical conductor may extend parallel to the first elongate electrode and the second electrical conductor may extend parallel to the second elongate electrode.

The first electrical conductor, the first compensation circuit conductor part, the first electrode, the second electrode, the second electrical conductor and the second compensation circuit conductor part may all extend generally parallel to one another.

The arc deflection compensation system may comprise a controller for controlling the second DC power supply such that the magnitude of the second current $I_2$ may be selected or adjusted independently of the magnitude of the first current $I_1$.

The controller may be configured to control the second DC power supply to cause a parameter in the compensation circuit to follow variations of a corresponding parameter in the first and second elongate electrodes.

The controller may be configured automatically to cause the parameter in the compensation circuit to follow variations of the corresponding or associated parameter in the first and second electrodes.

For example, the controller may be configured to control the second DC power supply such that the second current $I_2$ in the compensation circuit changes in sympathy with variations in the first current $I_1$ in the first and second electrodes.

The controller may be configured to control the second DC power supply such that a magnitude of the second current $I_2$ is adjustable independently of a magnitude of the first current $I_1$.

The vessel may have any suitable shape, including but not limited to circular in transverse cross-section. In other embodiments the vessel may be rectangular with a plurality of first and second electrode pairs arranged on a center line of the vessel.

The vessel may comprise a steel shell lined with refractory material, or a refractory shell supported by a spring-loaded steel retaining structure. The vessel may comprise a roof and a bottom opposite the roof.

The steel shell may be kept at earth or ground potential. The steel shell and roof may be water-cooled.

The vessel may comprise at least one feed port for charging a load into the chamber and at least one outlet for gas. The at least one feed port and the at least one outlet for gas may be provided in the roof of the vessel.

The at least one feed port may comprise means for controlling a rate and/or volume of the load fed into the chamber for processing. The processing may comprise melting or smelting.

The load may comprise pre-reduced ores or pre-heated ores.

Pre-reduced ores are ores (including, but not limited to iron ore or ferroalloy ores) agglomerated into pellets or as fine ore, reduced in a pre-reduction vessel and then transferred as a hot charge into the chamber for melting and/or further reduction, alternatively cooled down and then charged into the chamber as a cold charge.

Pre-heated ores are fine ore or agglomerated ore, pre-heated inside another vessel, prior to being charged into the chamber for reduction inside the furnace.

The at least one outlet may comprise a means for controlling a rate and/or volume of hot gas escaping from the chamber.

The at least first and second elongate electrodes may be positioned to extend through the roof of the vessel and into the chamber. The electrodes may extend towards a burden comprising a body of slag and a body of molten or partially molten material, or, metal, within the chamber.

The furnace may be operated in brush-arc manner with the second ends of the first and second electrodes maintained a short distance above the burden in the chamber. A brush-arc is a short arc between the second ends of the electrodes and the burden.

The body of slag may be positioned above the body of molten metal. The body of slag and the body of molten metal may be separated due to differences in density between slag and metal.

The vessel may define a first tap hole for tapping off some of the slag. The vessel may further define a second tap hole for tapping off some of the molten metal.

The electrodes may be self-baking electrodes known as Soderberg-type electrodes alternatively pre-baked graphite electrodes. The electrodes may be adjustable in an axial direction. The electrodes may each have a center axis, which axes may be arranged on a transverse center line of the vessel.

According to another aspect of the invention there is provided a method of controlling brush-arcs in a DC brush-arc furnace wherein a first current flows in a first direction to a first elongate electrode of the furnace, in a second direction through the first elongate electrode to form a first brush-arc between the first electrode and a burden in the furnace and in the first direction through a second elongate electrode of the furnace to form a second brush-arc between the second elongate electrode and the burden, the method comprising the steps of:

- causing a second current to flow in the first direction in juxtaposition with the first electrode; and
- causing the second current to flow in the second direction in juxtaposition with the second elongate electrode, thereby to counteract opposed magnetic fields caused by the first current in the first and second elongate electrodes and deflection of the first and second brush-arcs.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
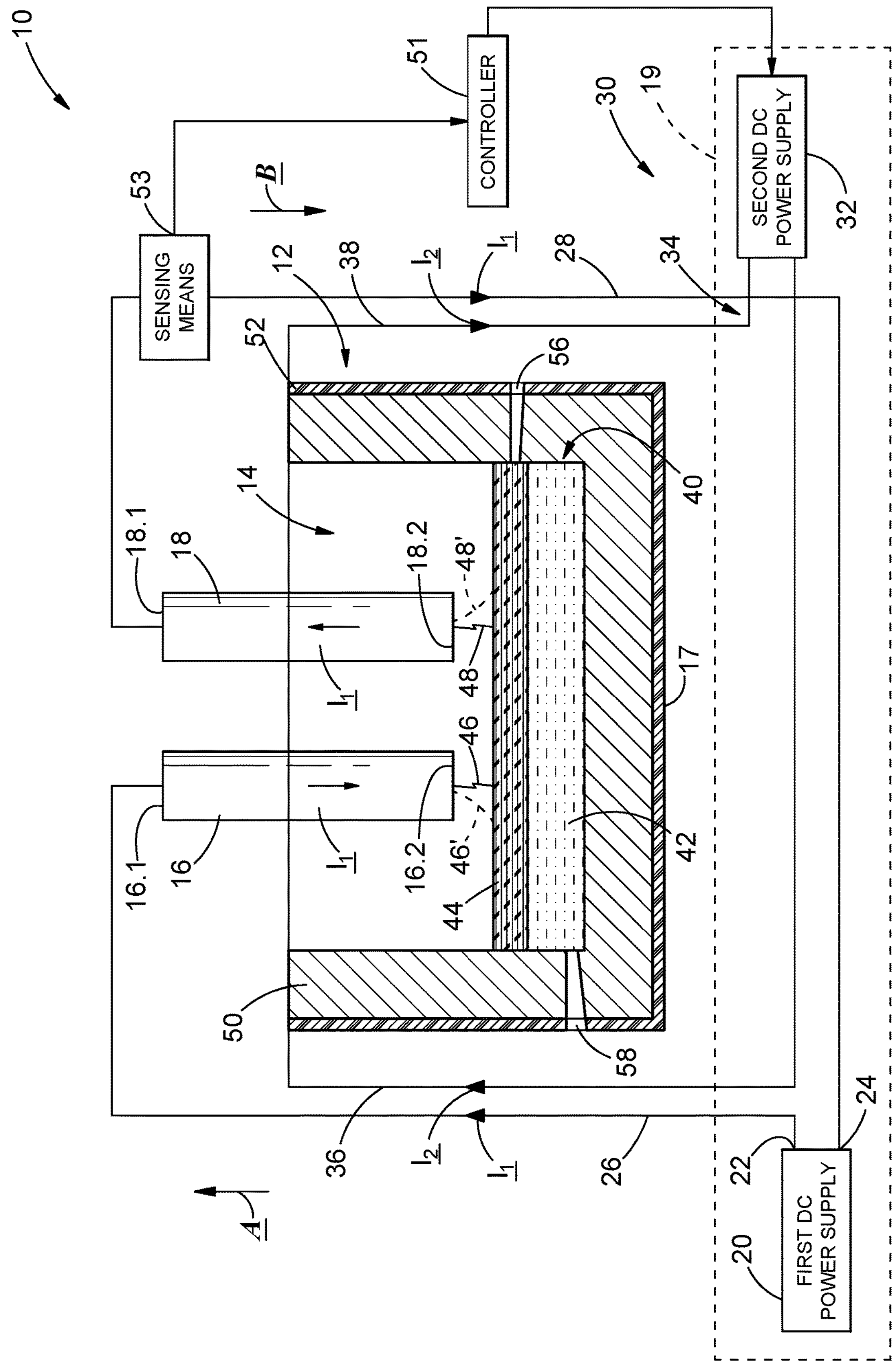
FIG. 1 is a diagrammatic representation of a furnace showing a vessel of the furnace in axial section and associated electrical circuitry.
Figure 2:
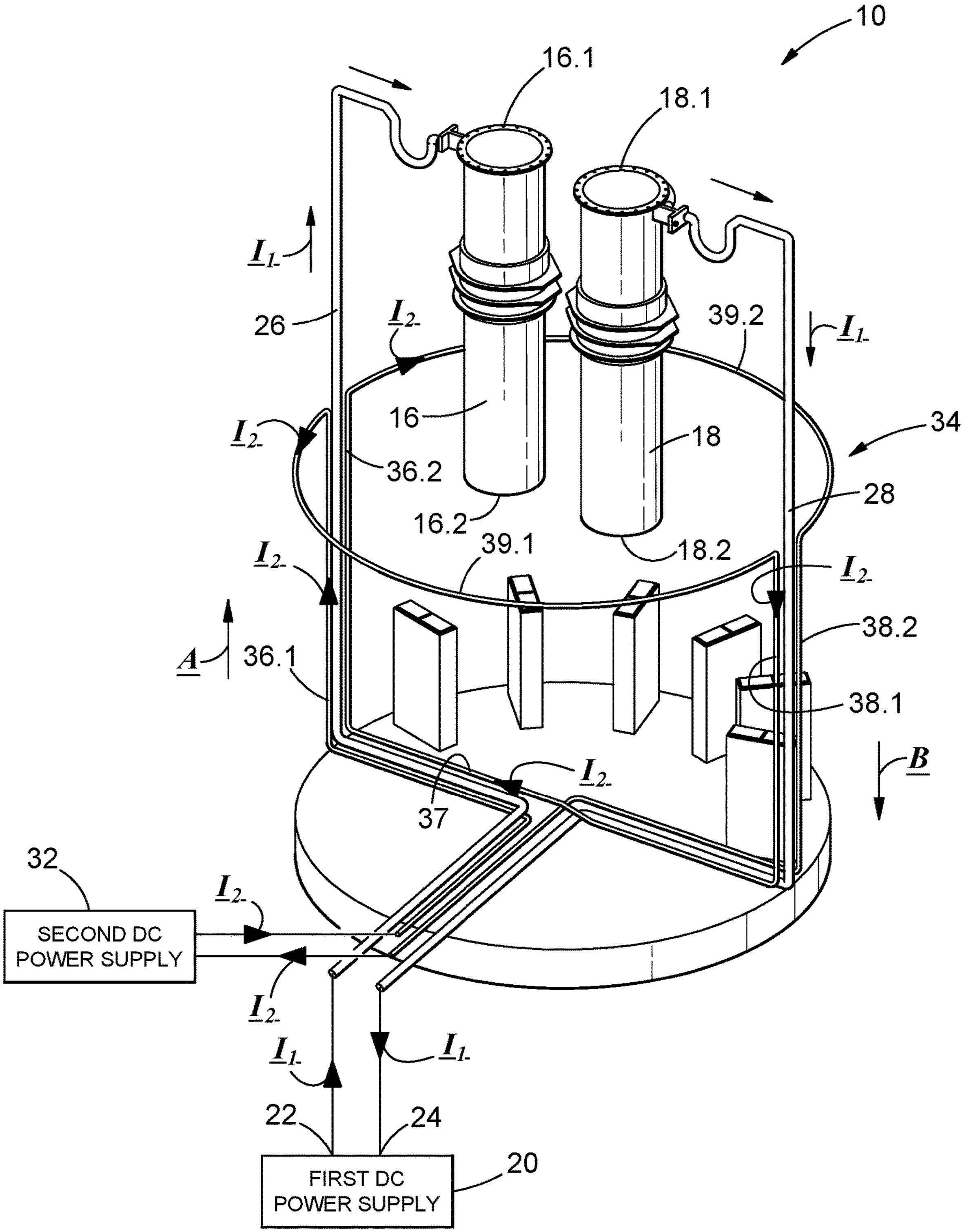
FIG. 2 is a diagrammatic perspective view of the furnace, with parts removed for better clarity, and the electrical circuits.
Figure 3:
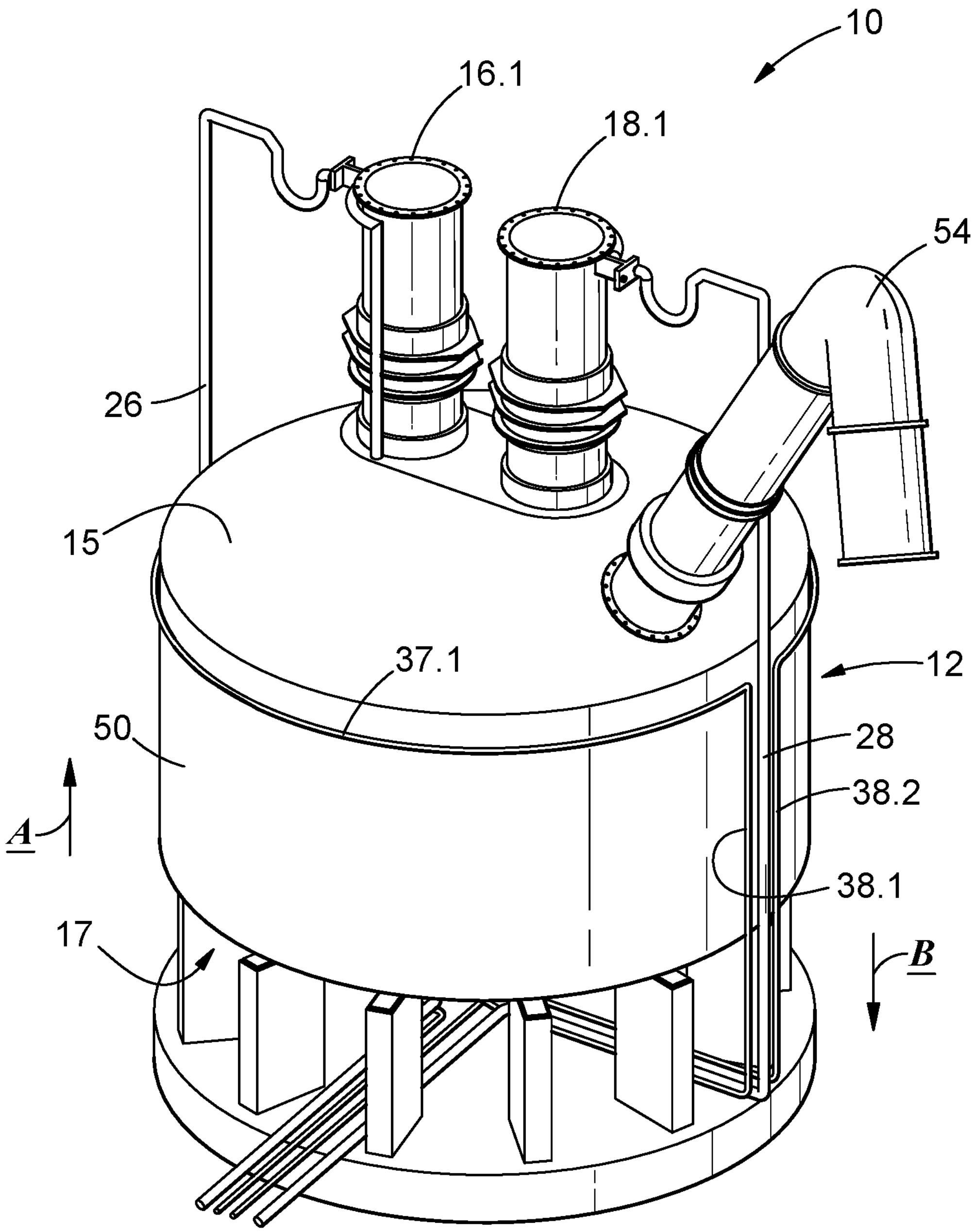
FIG. 3 is a diagrammatic three-dimensional view of the furnace.

An example embodiment of a furnace is generally designated by the reference numeral 10 in FIGS. 1 to 3.

Referring to FIG. 1, the example embodiment of the furnace comprises a vessel 12 defining a chamber 14. The vessel comprises a roof 15 (shown in FIG. 3) and a bottom 17 opposite the roof. A first elongate electrode 16 and a second elongate electrode 18 extend through the roof and parallel to one another from respective first ends 16.1, 18.1 and terminating at respective second ends 16.2, 18.2 in the chamber 14. A DC power supply system 19 comprises a first DC power supply 20 which supplies power to the first and second elongate electrodes 16, 18, and is connected to a first pole 22 and a second pole 24.

A first electrical conductor 26 preferably extends parallel to the first elongate electrode 16 between the first pole 22 and the first end 16.1 of the first elongate electrode 16, so that a first current $I_1$ flows in a first direction A through the first electrical conductor 26 and in a second opposite direction B from the first end 16.1 of the first elongate electrode 16 to the second end 16.2 of the first elongate electrode 16 to drive the first elongate electrode 16 as an anode.

A second electrical conductor 28 preferably extends between the second pole 24 and the first end 18.1 of the second elongate electrode 18 preferably parallel to the second elongate electrode 18, so that the current $I_1$ flows in the first direction A from the second end 18.2 of the second elongate electrode 18 to the first end 18.1 of the second elongate electrode 18 to drive the second elongate electrode 18 as a cathode and then in the second direction B through the second electrical conductor 28.

An arc deflection compensation system 30 comprises a second DC power supply 32 of the DC power supply system 19 and a compensation circuit 34 comprising at least a first compensation circuit conductor part 36.1 extending parallel and in juxtaposition to the first elongate electrode 16 and a second compensation circuit conductor part 38.1 extending parallel and in juxtaposition to the second elongate electrode 18. The second DC power supply 32 causes a second current $I_2$ to flow through the first compensation circuit conductor part 36.1 in the first direction A and through the second compensation circuit conductor part 38.1 in the second direction B.

The second ends 16.2 and 18.2 of the elongate electrodes terminate a short distance above a burden 40 in the chamber 14. The burden 40 comprises a body or layer of molten metal 42 and a body or layer of slag 44 on top of the body of molten metal 42. In use, the electrodes 16 and 18 are driven in brush-arc manner.

It will be appreciated that in a furnace of the above kind (but without the compensation circuit 34) the first current $I_1$ flowing in the first direction A through the first elongate electrode 16 causes, in accordance with Ampere's right-hand rule, a first magnetic field in a first direction. The first current $I_1$ flowing in the second direction B through the second elongate electrode 18 causes, in accordance with Ampere's right-hand rule, a second magnetic field in an opposite direction. The first and second magnetic fields mutually interact with one another to cause a brush-arc 46 between the second end 16.2 of the first elongate electrode and the burden 40 and a brush-arc 48 between the second end 18.2 of the second elongate electrode 18 and the burden 40, to diverge away from one another (as shown in broken lines 46', 48' in FIG. 1), thereby to cause arc-deflection and undesirable stirring in the body of slag 44 and possible overheating and damage to the furnace sidewalls 50.

The compensation system current $I_2$ flowing through the first and second compensation circuit conductor parts 36.1, 38.1 together with the first current $I_1$ flowing through the first and second electrical conductors 26, 28 generate a combined magnetic field that opposes a magnetic field generated by the current $I_1$ flowing through the brush-arcs 46', 48'. The combined magnetic field serves to reduce a divergence of the brush-arcs 46', 48' (as shown in broken lines) to a situation as shown in solid lines 46, 48 or even to the extent that brush-arcs 46, 48 may converge towards one another.

The first electrical conductor 26, the first compensation circuit conductor part 36.1, the first elongate electrode 16, the second elongate electrode 18, the second electrical conductor 28 and the second compensation circuit conductor part 38.1 all extend generally parallel to one another.

In the example embodiment, the compensation system 30 preferably comprises a controller 51 which is configured to control the second DC power supply 32 such that the magnitude or value of a parameter such as the second current $I_2$ is changed in sympathy with or to follow changes sensed by sensing means 53 in the first current $I_1$.

A presently preferred configuration of the compensation circuit 34 is illustrated in FIGS. 2 and 3. The compensation circuit 34 is connected to the second DC power supply 32. The compensation circuit 34 comprises the first compensation circuit conductor part 36.1, a first semi-circular link 39.1, the second compensation circuit conductor part 38.1, a bottom link 37, a third compensation circuit conductor part 36.2, a second semi-circular link 39.2, and a fourth compensation conductor part 38.2. The second DC power supply 32 is electrically connected to the first compensation circuit conductor part 36.1. The first compensation circuit conductor part 36.1 extends vertically and parallel to the first electrode 16. The first compensation circuit conductor part 36.1 is electrically connected to the second compensation circuit conductor part 38.1 by the first semi-circular link 39.1. The first semi-circular link 39.1 is located in a generally horizontal plane in a region towards the roof 15 of the vessel 12 and extends circumferentially with a first region of a wall of the vessel. The second compensation circuit conductor part 38.1 extends vertically and parallel to the second electrode 18. The second compensation circuit conductor part 38.1 is electrically connected to the third compensation conductor part 36.2 by the bottom link 37. The bottom link 37 is located below the vessel 12 and extends generally horizontally between the second compensation circuit conductor part 38.1 and the third compensation conductor part 36.2. The third compensation circuit conductor part 36.2 extends vertically and parallel to the first electrode 16. The third compensation circuit conductor part 36.2 is electrically connected to the fourth compensation circuit conductor part 38.2 by the second semi-circular link 39.2. The second semi-circular link 39.2 is also located in the generally horizontal plane in a region towards the roof 15 of the vessel 12 and extends circumferentially with an opposite region of the wall of the vessel. The fourth compensation circuit conductor part 38.2 extends vertically and parallel to the second electrode 18. The fourth compensation circuit conductor part 38.2 is electrically connected to the second DC power supply 32.

The location of the first and third compensation circuit conductor parts 36.1, 36.2 causes the current $I_2$ to flow in the same direction A through the first and third compensation circuit conductor parts 36.1, 36.2. Similarly, the location of second and fourth compensation circuit conductors 38.1, 38.2 causes the current $I_2$ to flow in the same direction B through the second and fourth compensation circuit conductors 38.1, 38.2.

In alternative embodiments, where the vessel 12 of the furnace 10 has another shape, the semi-circular links 39.1, 39.2 may be shaped according to an outer perimeter of the vessel 12.

In a preferred embodiment the vessel 12 has a circular shape in transverse cross-section and comprises a steel shell 52 lined with refractory material 50. The steel shell is kept at earth or ground potential.

The elongate electrodes 16, 18 are self-baking electrodes known as Søderberg-type electrodes, alternatively pre-baked graphite electrodes. The electrodes 16, 18 are independently adjustable in an axial direction. The electrodes 16, 18 each has a center longitudinal axis, which axes are arranged on a transverse center line of the circular vessel 12.

The vessel 12 comprises a feed port 54 (shown in FIG. 3), through which a load can be charged into the chamber. The feed port 54 is situated in the roof of the vessel. The feed port 54 comprises a means which controls a rate and/or volume of the load which is fed into the chamber 14. The load fed into the chamber 14 is processed by melting or smelting of the load.

The vessel further comprises a gas outlet (not shown) in the roof 15. The gas outlet comprises means which controls a rate and/or volume of gas escaping from the chamber 14.

The vessel 12 defines a first tap hole 56 for tapping off some slag 44 and a second tap hole 58 for tapping off some molten metal 42.

It will be appreciated that there are many variations in detail in the furnace without departing from the scope and spirit description.

For example, in other example embodiments of the furnace, the power supply system 19 may comprise a single DC power supply, which is connectable to both the first and second elongate electrodes 16, 18 and the second DC power supply 32.

The invention claimed is:

1. A furnace comprising:
- a vessel defining a chamber;
- at least a first elongate electrode and a second elongate electrode extending parallel to one another from respective first ends and terminating at respective second ends in the chamber;
- a DC power supply system having a first pole and a second pole;

a first electrical conductor extending between the first pole and the first end of the first elongate electrode, so that a first current $I_1$ flows in a first direction A through the first electrical conductor and in a second opposite direction B from the first end of the first elongate electrode to the second end of the first elongate electrode to drive the first elongate electrode as an anode;

a second electrical conductor extending between the second pole and the first end of the second elongate electrode, so that the first current $I_1$ flows in the first direction A from the second end of the second elongate electrode to the first end of the second elongate electrode and in the second direction B through the second electrical conductor to drive the second elongate electrode as a cathode; and an arc deflection compensation system comprising a compensation circuit connected to the DC power supply system, the compensation circuit comprising at least a first compensation circuit conductor part extending parallel to the first elongate electrode and a second compensation circuit conductor part extending parallel to the second elongate electrode, the DC power supply system causing a second current $I_2$ to flow through the first compensation circuit conductor part in the first direction A and through the second compensation circuit conductor part in the second direction B.

2. The furnace as claimed in claim 1 wherein the DC power supply system comprises a first DC power supply and a second DC power supply, wherein the first DC power is connected to the first and second poles and wherein the second DC power supply is connected to the compensation circuit.

3. The furnace as claimed in claim 1 wherein the first DC power supply and the second DC power supply are the same power supply.

4. The furnace as claimed in claim 1 wherein the second DC power supply is different and separate from the first DC power supply.

5. The furnace as claimed in claim 1 wherein the first electrical conductor extends parallel to the first elongate electrode and the second electrical conductor extends parallel to the second elongate electrode.

6. The furnace as claimed in claim 1 wherein the first electrical conductor, the first compensation circuit conductor part, the first elongate electrode, the second elongate electrode, the second electrical conductor and the second compensation circuit conductor part all extend generally parallel to one another.

7. The furnace as claimed in claim 4 wherein the arc deflection compensation system comprises a controller configured to control the second DC power supply.

8. The furnace as claimed in claim 7 wherein the controller is configured to control the second DC power supply to cause a parameter in the compensation circuit to follow variations of a corresponding parameter in the first and second elongate electrodes.

9. The furnace as claimed in claim 8 wherein the controller is configured automatically to cause the parameter in the compensation circuit to follow variations of the corresponding parameter in the first and second elongate electrodes.

10. The furnace as claimed in claim 8 wherein the controller is configured to control the second DC power supply such that the second current $I_2$ in the compensation circuit changes in sympathy with variations in the first current $I_1$ in the first and second elongate electrodes.

11. The furnace as claimed in claim 7 wherein the controller is configured to control the second DC power supply such that a magnitude of the second current $I_2$ is adjustable independently of a magnitude of the first current $I_1$.

* * * * *